United States Patent [19]

Tashiro et al.

[11] Patent Number: 5,081,918
[45] Date of Patent: Jan. 21, 1992

[54] MATERIAL SUPPLY APPARATUS

[75] Inventors: Yasunori Tashiro; Daiji Tomiyama, both of Utsunomiya, Japan

[73] Assignee: Rheon Automatic Machinery Co., Ltd., Utsunomiya, Japan

[21] Appl. No.: 666,290

[22] Filed: Mar. 8, 1991

[30] Foreign Application Priority Data

Mar. 9, 1990 [JP] Japan .................................. 2-24025

[51] Int. Cl.⁵ .............................................. A23G 3/00
[52] U.S. Cl. .................... 99/450.6; 99/450.7; 99/494; 425/131.1; 425/145
[58] Field of Search .................. 99/450.1, 450.6, 450.7, 99/450.8, 494; 426/512, 516, 281, 282, 283; 222/381, 235; 425/145, 131.1, 204, 209, 449, 133.1

[56] References Cited

U.S. PATENT DOCUMENTS

| 1,793,752 | 2/1931 | Schuler | 99/450.6 |
|---|---|---|---|
| 3,763,765 | 10/1973 | Nelson et al. | 99/450.7 |
| 4,084,494 | 4/1978 | Ezaki | 99/494 |
| 4,334,464 | 6/1982 | Shinriki | 99/450.6 |
| 4,469,475 | 9/1984 | Krysiak | 425/133.1 |
| 4,570,298 | 2/1986 | Tribbett | 99/450.7 |
| 4,647,467 | 3/1987 | Pinto | 425/145 |
| 4,767,305 | 8/1988 | Tashiro | 426/518 |
| 4,828,863 | 5/1989 | Aoki | 99/450.7 |
| 4,832,961 | 5/1989 | Aoki | 222/381 |
| 4,859,479 | 8/1989 | Hayashi et al. | 426/281 |

FOREIGN PATENT DOCUMENTS

1211912 3/1966 Fed. Rep. of Germany ..... 99/450.7

*Primary Examiner*—Timothy F. Simone
*Attorney, Agent, or Firm*—Guy W. Shoup; David W. Heid

[57] ABSTRACT

A food material supply apparatus including at least one diametrically slotted roller located on the bottom of a hopper, a plate slidably inserted in each slot, a groove semicircular in cross section in the bottom of the hopper and extending parallel to roller, a hollow cylinder rotatably and complementarily fitted in the groove and formed with an axial opening having a length substantially equal to that of the rollers, a piston reciprocating in the cylinder, a food material extruding device connected to the delivery end of the cylinder, and a turntable located under the food material extruding device and having pockets for receiving the food material extruded from the extruding device. This apparatus enables a predetermined amount of vegatables and meat to be filled into a covering without any excessive agitation.

9 Claims, 6 Drawing Sheets

MATERIAL SUPPLY APPARATUS

BACKGROUND OF THE INVENTION

1. Field of the Invention

This invention relates to a food material supply apparatus for continuously supplying masses of solid or semi-fluid food materials. More particularly, it relates to a food material supply apparatus in which a food material that is a mixture of meat, vegetables, etc., is continuously supplied in a cup-shaped form. This apparatus can be advantageously used for producing a food product of a small size wrapped by a cup-form dough coating, such as, for example, a shao-mai, a type of oriental food.

2. Prior Art

Various kinds of apparatus for manufacturing shao-mai's are now available and sold on the market. The material feeding mechanism used in the prior art apparatus resorts to forced extrusion of food materials by a screw or by the suction and extrusion of food materials by the combination of a piston and a cylinder. The extrusion of food materials in the manner stated above leads to various disadvantages such as the destruction of the tissue structure of the food materials and the liberation of water from them. Its metering of the amount of the food materials is inaccurate. This leads to a lowered quality product.

SUMMARY OF THE INVENTION

This invention provides a food material supply apparatus for continuously supplying masses of solid or semi-fluid food materials.

This apparatus comprises a food material supply apparatus comprising a hopper containing a food material to be supplied, two driven rollers provided in the hopper and spaced apart by a predetermined distance from each other thereby forming a passage therebetween for the food material to move downward, each roller being provided with at least a slot along the diameter thereof, a plate longer in cross section than the diameter of the roller and slidably inserted into each slot, means to cause each plate to extend from each roller into the passage for the food material to propel it downward, a groove substantially semicircular in cross section and provided between the rollers in the bottom of the hopper and extending parallel to the axis of each roller, a hollow cylinder rotatably and complementarily fitted in the groove and formed with an axial opening having a length substantially equal to that of the rollers thereby leaving a semicircular wall along the opening, the cylinder being positioned so that the semicircular wall thereof abuts the groove face to face while the food material is propelled downward by the plates and, each time and after the food material is propelled downward by the plates, being rotated 180° to form a cylindrical space surrounded by the semicircular wall of the cylinder and the wall of the groove, a first piston arranged to reciprocate in the cylinder in synchronization with the rotation of the cylinder so that it advances when the cylindrical space is formed, thereby extruding the food material in the cylindrical space, and which then retracts to its original position, a food material extruding device connected to the delivery end of the cylinder, and a turntable located under the food material extruding device and having pockets for receiving the food material extruded from the food material extruding device.

This invention also provides a food material supply apparatus comprising a hopper containing a food material to be supplied, a driven roller provided in the hopper and spaced apart by a predetermined distance from a side wall of the hopper thereby forming a passage therebetween for the food material to move downward, the roller being provided with a slot along the diameter thereof, a plate longer in cross section than the diameter of the roller and slidably inserted in the slot, means to cause the plate to extend from the roller into the passage for the food material to propel it downward, a groove substantially semicircular in cross section and provided between the roller and the side wall in the bottom of the hopper and extending parallel to the axis of the roller, a hollow cylinder rotatably and complementarily fitted in the groove and formed with an axial opening having a length substantially equal to that of the roller thereby leaving a semicircular wall along the opening, the cylinder being positioned so that the semicircular wall thereof abuts the groove face to face while the food material is propelled downward by the plate and, each time and after the food material is propelled downward by the plate, being rotated 180° to form a cylindrical space surrounded by the semicircular wall of the cylinder and the wall of the groove, a first piston arranged to reciprocate in the cylinder in synchronization with the rotation of the cylinder so that it advances when the cylindrical space is formed, thereby extruding the food material in the cylindrical space, and which then retracts to its original position, a food material extruding device connected to a delivery end of the cylinder, and a turntable located beneath the food material extruding device and having pockets for receiving the food material extruded from the food material extruding device.

In a preferred embodiment of this invention the food material extruding device includes a vertically positioned cylindrical housing provided with a hole communicating with the cylinder, a vertically movable pipe fitted in the housing and provided with a food material inlet, and a piston that is movably fitted in the pipe, the pipe being adapted to be inserted into the pockets of the turntable when the pipe downwardly moves, so that the food material inlet communicates with the delivery end of the cylinder.

In another preferred embodiment of this invention, after the pipe is inserted in the pockets, the piston in the pipe is arranged to move downwardly and supply the pockets with the food material that has been fed through the food material inlet into the pipe.

In a further preferred embodiment of the invention, an extruding piston is provided in each pocket, the extruding piston being vertically arranged and reciprocating in the pocket, so that when the extruding piston moves upwardly the food material that has been filled in the pocket is extruded from the pocket.

By this invention the density of the food material charged into the cylindrical chamber can be suitably adjusted. Namely, the amount of the charged food material is adjusted by not only changing the advancing stroke of the piston in the cylinder, but also by adjusting the speed of rotation of the rollers. Thus, food material can be metered and then be filled in a cup-shaped covering without destroying the tissue structure.

It is therefore an object of this invention is to provide a food material supply apparatus of a simple structure in which a food material can be metered and fed without being subjected to any excessive pressure.

DESCRIPTION OF THE PREFERRED EMBODIMENT

Figure 1:
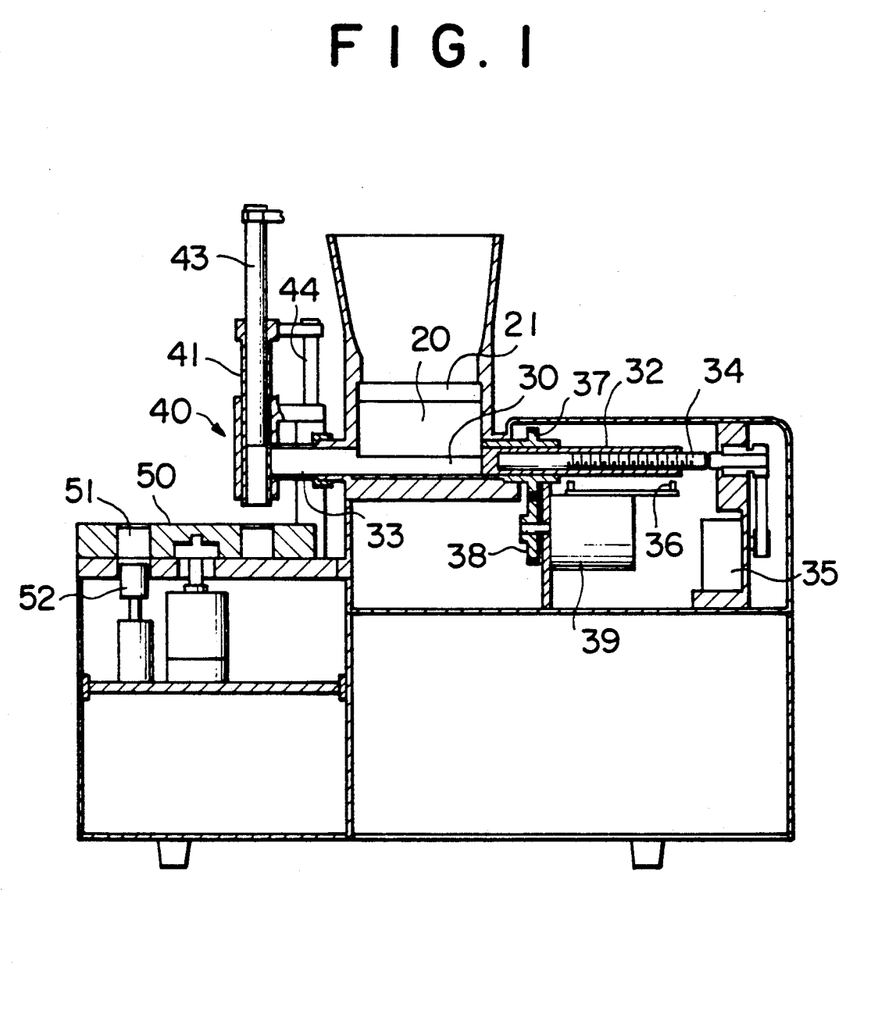
FIG. 1 shows a sectional side view of a food material supply apparatus of an embodiment of the present invention.
Figure 2:
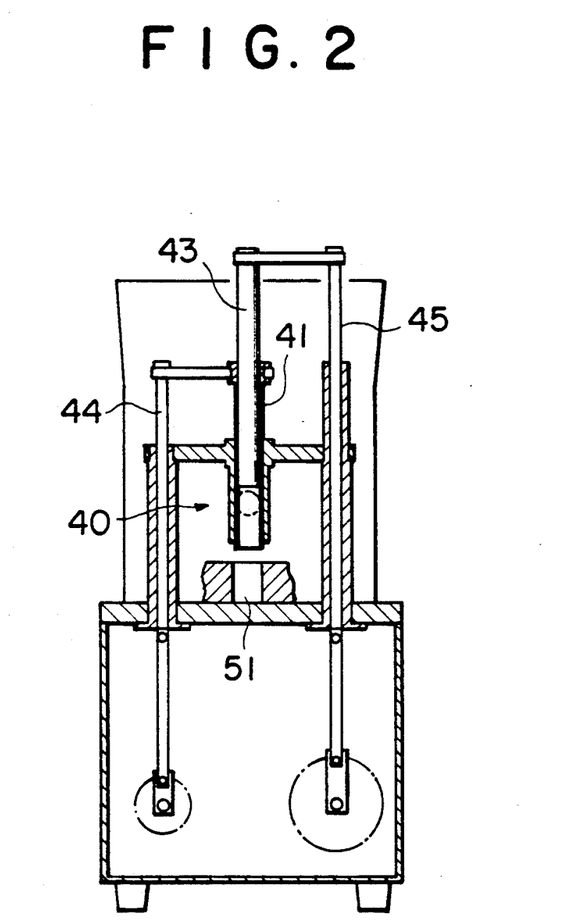
FIG. 2 is a sectional front view, partially broken away, of the embodiment of the present invention.
Figure 3:
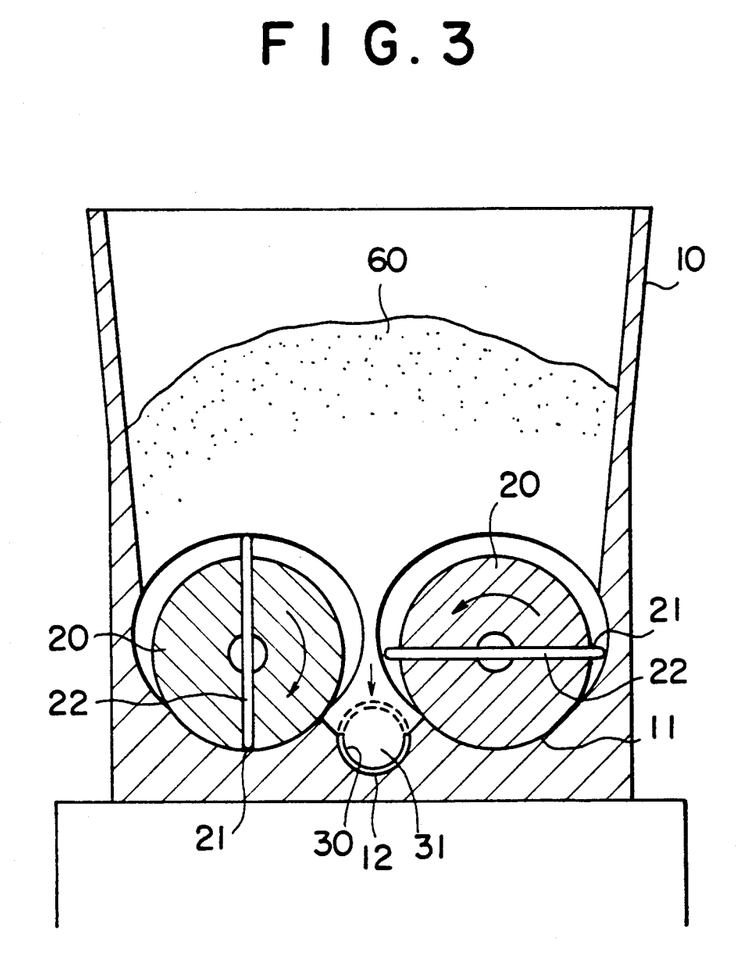
FIG. 3 is a sectional front view of the embodiment of a cross section of the present invention.
Figure 4:
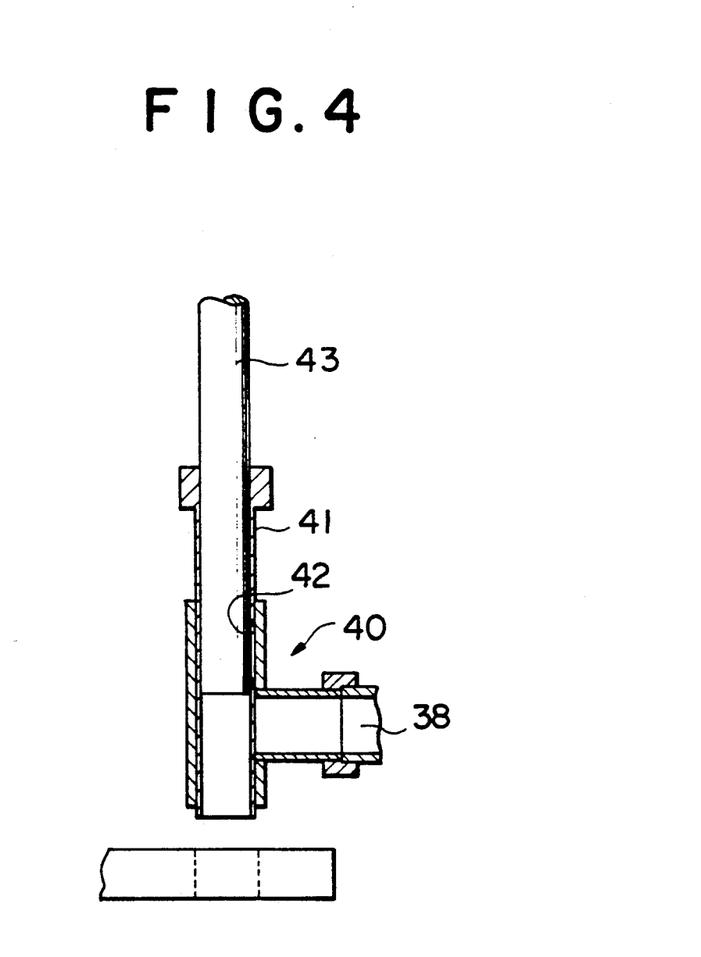
FIG. 4 is a partial cross sectional side view of the embodiment of the present invention.

In FIGS. 1 and 3 hopper 10 is square in cross section, with two end walls and two side walls. It contains at its bottom a pair of rollers 20, the shaft of each roller being supported in a hole formed in each wall. They are spaced apart by a predetermined distance. The bottom of the hopper 10 is configured so that parallel recesses are provided, each recess complementary with a piston of each roller. Each wall of the hopper 20 has a cam recess 11 cut therein, into which cam an end of each roller is held. Each roller 20 has a diametrically cut slot 21 extending substantially along the entire length of the roller. A rectangular plate 22 substantially the same size as the slot 21 is slidably inserted therein. The width of the plate 22 is greater than the diameter of the roller. Each plate 22 engages at both of its ends each of the cams 11, so that, when the roller 20 rotates, the plate 22, regulated by the contour of the cams 11, protrudes and retracts from the surface of the roller 20. The inclination of the plate 20 is changed by rotating the roller.

A groove 12 substantially semicircular in cross section is provided in the bottom of the hopper between the rollers 20. The groove extends over the entire length of the rollers. A hollow cylinder 30 of a greater length and complementary in shape is rotatably fitted in this groove 12. The cylinder 30 is formed on its side with an elongate axial opening whose length is substantially equal to that of the rollers. The cylinder 30 is rotated through an angle of 180 degrees around its axis so that it faces upward or a cylindrical chamber 31 is defined by the groove 12 and the cylinder 30. The cylinder 30 is inserted into a delivery passage 33.

A piston 32 is arranged to reciprocate in the chamber 31. The piston 32 is hollow and internally screw-threaded and meshes with a feed screw 34 driven by a reversible motor 35. The piston 32 is moved into and out of the chamber 31 by the rotation of the screw 34. Sensors 36 are provided at appropriate positions by the feed screw 34 so as to detect the advancing or retracting stroke of the piston 32. On the basis of the value detected by the sensors 36, the advancing or retracting stroke of the piston 32 can be adjusted by the rotation of the reversible motor 35 driving the screw 34. The amount of the food material to be projected from the cylindrical chamber 31 can be adjusted by changing the advancing stroke of the piston 32. A gear 37 is mounted on a part of the outer peripheral surface of the cylinder 30, and meshes with a mating gear 38 driven by a motor 39, so that intermittent rotation of the motor 39 causes a corresponding intermittent rotation of the cylinder 30 through the gear 38.

A food material extruding device 40 includes a vertically positioned cylindrical housing provided with a hole on its side wall. The hole communicates with the food material delivery passage 33. The food material extruding device 40 includes a vertically movable pipe 41 fitted in the housing. On the side wall of the pipe 41 an inlet 42 is provided, so that when the pipe 41 is moved vertically to a certain position the internal space of the pipe 41 communicates with the food material delivery passage 33. A piston 43 is positioned so that it can reciprocate in the pipe 41 to downwardly urge a food material that is supplied from the food material delivery passage 33. The pipe 41 is fixedly held by a rod 44 that is arranged to move vertically. The piston 43 is fixedly supported by a rod 45 connected to a power source not shown in the drawings.

A turntable 50 is located beneath the food material extruding device 40. The turntable is provided with a plurality of pockets 51, and rotates about its axis so that each pocket is positioned in turn beneath the lower end of the pipe 41, and is arranged to receive the food material from the pipe 41. When the rod 44 is vertically moved to bring the pipe 41 to the position where the food material inlet 42 of the pipe 41 communicates with the material delivery passage 33, the lower end of the pipe 41 is advanced into one of pockets 51 provided on a turntable 50. An extruding piston 52 is provided under the turntable at a position away from the food material extending device 40 and arranged to vertically move upward into the pocket 51 positioned above it to push up the food material filled in the pocket and then to move downward to its original position.

The invention can be utilized by another embodiment of a food material supply apparatus. It includes only one driven roller provided in the hopper instead of two rollers 20. When one roller is used, it is located apart by a predetermined distance from the side wall of the hopper and a passage is formed between the roller and the wall. The groove is provided between the roller and the side wall in the bottom of the hopper. The food material is propelled by the plate downward through the passage between the roller and the side wall of the hopper. Other constructions are the same as the embodiment explained above.

The sequence of the operation of the parts stated above will now be explained.

1) When the rollers 20 are rotated the plates 22 are slidably moved in the slots 21 as regulated by the cams 11 and are protruded or retracted from the surface of the rollers 20. When the plate 22 is protruded into the space between the rollers, the food material in the hopper, positioned above the rollers, is shoveled by the protruding plate into the cylinder 30 from the elongate axial opening.

2) The cylinder 30 is rotated through an angle of 180 degrees around its axis, so that the food material 60 is filled in it.

Figure 5A:
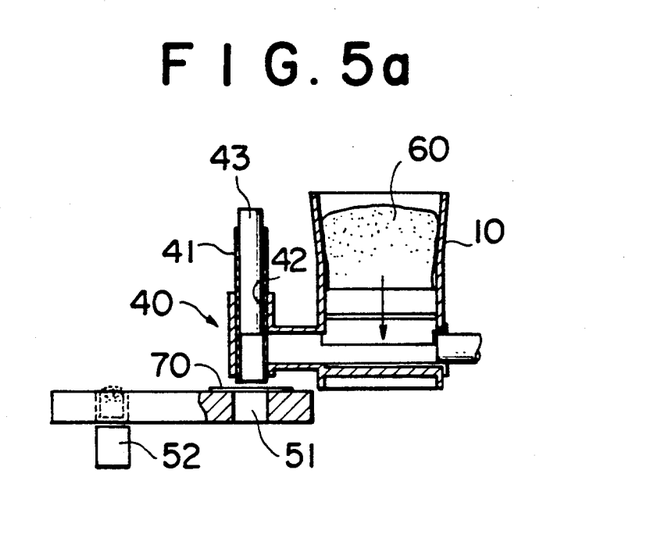
FIGS. 5(a) through 5(d) illustrate the operation of the material extruding device.
Figure 5B:
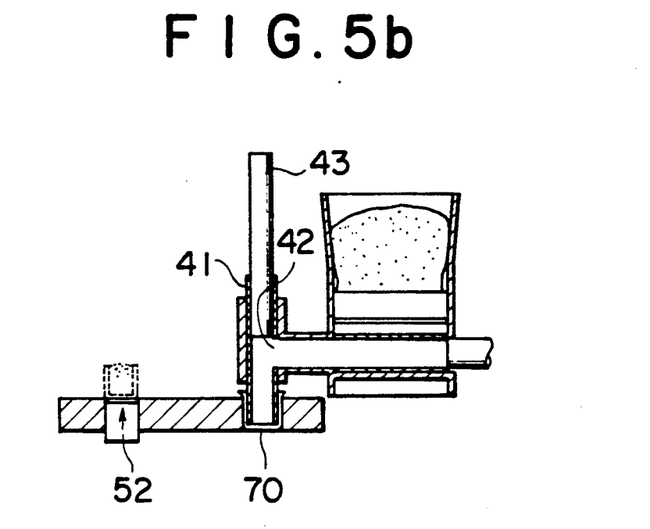

3) A thin envelope or covering 70 of wheat flour is manually placed on the pocket 51 positioned away from the food material extruding device 40, and when the turntable 50 is rotated so that the pocket overlaid with the envelope 70 is positioned beneath the food material extruding device 40, as shown is FIG. 5a, then, the pipe 41 is lowered into the pocket 51 and the envelope or covering 70 is forcedly pushed into the pocket 51 and shaped into a cup form, as shown in FIG. 5b.

Figure 5C:
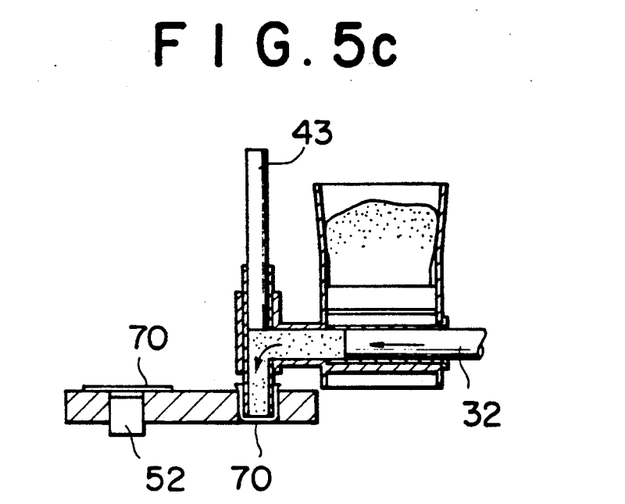

4) The piston 32 is advanced by a predetermined stroke so that, as shown in FIG. 5c, the food material 60 in the cylindrical chamber 31 is transferred toward and into the food material extruding device 40 through the passage 33 and the material inlet 42 of the pipe 41.

Figure 5D:
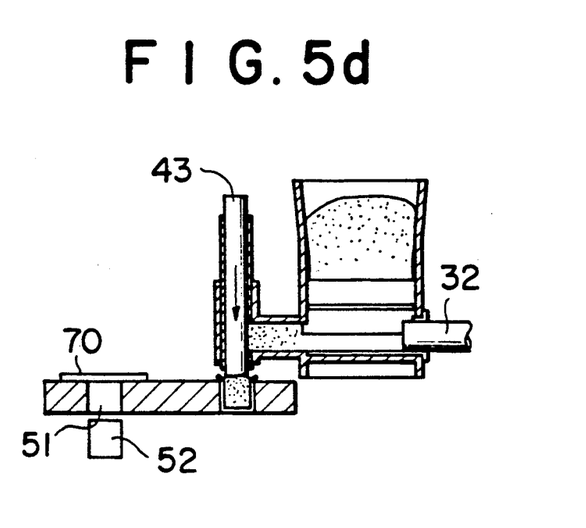

5) The rod 45 is downwardly moved to urge the piston 43 downward, so that the food material is filled in the pocket 51. As shown in FIG. 5d, thereupon the pipe 41 is moved upward.

6) The turntable 5 is rotated.

7) The extruding piston 52 is moved upward so as to extrude the shaped shao-mai from the turntable 50.

The individual motors are driven according to a program so that the operation can be carried out as stated above.

Unlike the prior art method of forced suction by the combination of the piston and the cylinder, no excessively high pressure is imparted to the filling, and the tissue structure of the filling is not destroyed.

The purpose of metering is achieved by cutting an extra mass of the food material out of the axial opening of the cylinder 30. The amount of the charged food material is adjusted not only by changing the advancing stroke of the first piston 32, but also by adjusting the amount of rotation of the rollers 20, so that the density of the food material charged into the cylindrical chamber 31 can be suitably adjusted. That is, the amount of the food material charged into and metered by the cylindrical chamber 31 can be charged in accordance with the properties of the food material. Thus, the food material can be filled under a pressure under which no water is liberated from the material, and the apparatus can deal with the case where a high filling pressure is required.

The length of the rollers 20 used in the present invention can be extended so that the length of the axial opening providing the material inlet to the cylinder 30 can be made large. Thus, in the cylinder there is no possibility that the food material to be charged can include hollow spaces because the plate forces the food material into it when the roller rotates. Thus, the supply of the food material into the cylinder 30 can be stabilized. The amount of the food material to be filled can be adjusted as required.

It will be understood from the foregoing statement of the present invention that a food material can be metered and fed without destroying the tissue structure. The food material supplied from the apparatus of this invention can be filled in a cup-shaped covering. Thus, the present invention can provide a simple and convenient apparatus by which a predetermined amount of vegetables and meat, which contain a large percentage of water protected by a delicate fibrous structure, can be filled into a covering without any excessive agitation.

We claim:

1. A food material supply apparatus comprising a hopper containing a food material to be supplied, two driven rollers provided in the hopper and spaced apart by a predetermined distance from each other thereby forming a passage therebetween for the food material to move downward, each roller being provided with at least a slot along the diameter thereof, a plate longer in cross section than the diameter of the roller and slidably inserted into each slot, means to cause each plate to extend from each roller into the passage for the food material to propel it downward, a groove substantially semicircular in cross section and provided between the rollers in the bottom of the hopper and extending parallel to the axis of each roller, a hollow cylinder rotatably and complementarily fitted in the groove and formed with an axial opening having a length substantially equal to that of the rollers thereby leaving a semicircular wall along the opening, the cylinder being positioned so that the semicircular wall thereof is received in the groove while the food material is propelled downward by the plates and, after the food material is filled in the groove, being rotated 180° to form a cylindrical space surrounded by the semicircular wall of the cylinder and the wall of the groove, a first piston arranged to reciprocate in the cylinder in synchronization with the rotation of the cylinder so that it advances when the cylindrical space is formed, thereby extruding the food material in the cylindrical space, and which then retracts to its original position, a food material extruding device connected to the delivery end of the cylinder, and a turntable located under the food material extruding device and having pockets for receiving the food material extruded from the food material extruding device.

2. A food material supply apparatus comprising a hopper containing a food material to be supplied, a driven roller provided in the hopper and spaced apart by a predetermined distance from a side wall of the hopper thereby forming a passage therebetween for the food material to move downward, the roller being provided with a slot along the diameter thereof, a plate longer in cross section than the diameter of the roller and slidably inserted in the slot, means to cause the plate to extend from the roller into the passage for the food material to propel it downward, a groove substantially semicircular in cross section and provided between the roller and the side wall in the bottom of the hopper and extending parallel to the axis of the roller, a hollow cylinder rotatably and complementarily fitted in the groove and formed with an axial opening having a length substantially equal to that of the roller thereby leaving a semicircular wall along the opening, the cylinder being positioned so that the semicircular wall thereof is received in the groove while the food material is propelled downward by the plate and, after the food material is filled in the groove, being rotated 180° to form a cylindrical space surrounded by the semicircular wall of the cylinder and the wall of the groove, a first piston arranged to reciprocate in the cylinder in synchronization with the rotation of the cylinder so that it advances when the cylindrical space is formed, thereby extruding the food material in the cylindrical space, and which then retracts to its original position, a food material extruding device connected to the delivery end of the cylinder, and a turntable located under the food material extruding device and having pockets for receiving the food material extruded from the food material extruding device.

3. The food material supply apparatus of claim 1 wherein the food material extruding device includes a vertically positioned cylindrical housing provided with a hole communicating with the cylinder, a vertically movable pipe fitted in the housing and provided with a food material inlet, and a second piston that is movably fitted in the pipe, the pipe being adapted to be inserted into the pockets of the turntable when the pipe downwardly moves, so that the food material inlet communicates with the delivery end of the cylinder.

4. The food material supply apparatus of claim 3 wherein, after the pipe is inserted in the pockets, the second piston is arranged to move downwardly and to supply the pockets with the food material that has been fed through the food material inlet into the pipe.

5. The food material supply apparatus of claim 1 wherein an extruding piston is provided in each pocket, the extruding piston being vertically arranged and reciprocating in the pocket, so that when the extruding piston moves upwardly the food material that has been filled in the pocket is extruded from the pocket.

6. The food material supply apparatus of claim 2 wherein the food material extruding device includes a vertically positioned cylindrical housing provided with a hole communicating with the cylinder, a vertically movable pipe fitted in the housing and provided with a food material inlet, and a second piston that is movably fitted in the pipe, the pipe being adapted to be inserted into the pockets of the turntable when the pipe downwardly moves, so that the food material inlet communicates with the delivery end of the cylinder.

7. The food material supply apparatus of claim 6 wherein, after the pipe is inserted in the pockets, the second piston is arranged to move downwardly in the pipe to supply the pockets with the food material.

8. The food material supply apparatus of claim 2 wherein an extruding piston is provided in each pocket, the extruding piston being vertically arranged and reciprocating in the pocket, so that when the extruding piston moves upwardly the food material that has been filled in the pocket is extruded from the pocket.

9. An apparatus for separating a predetermined portion from a food material mass and supplying said predetermined portion to a desired location comprising:
   a hopper (10) for containing said food material mass, said hopper having a closed end defining a groove (12), said groove (12) having a semicircular cross section;
   means for propelling (20) said food material mass toward said closed end such that an elongated body of said food material mass is pressed into and adjacent said groove (12);
   a semicylindrical wall (30) rotatably disposed adjacent said groove such that when said semicylindrical wall is rotated into a closed position, a cylindrical chamber (31) is defined by said semicylindrical wall (30) and said groove (12), said elongated body being disposed within said cylindrical chamber (31);
   means for extruding a predetermined portion of said elongated body comprising:
      a cylindrical passage (33) having a first end communicating with one end of said cylindrical chamber (31), and a second end;
      a first piston (32) movably disposed in said cylindrical chamber (31); and
      means for driving said piston (32) a predetermined distance along said cylindrical chamber (31), thereby extruding said predetermined portion of said elongated body through said cylindrical passage (33); and
   means for directing (40) said predetermined portion to a desired location comprising:
      a pipe (41) having an opening (42) communicating with said second end of said cylindrical passage (33);
      a second piston (43) movably disposed in said pipe; and
      means for driving said second piston (43) against said predetermined portion such that when said predetermined portion is extruded through said cylindrical passage (33) and into said pipe (41), said piston (43) separates said predetermined portion from said elongated body and drives said predetermined portion to said desired location.

* * * * *